(12) United States Patent
Tootoonchian et al.

(10) Patent No.: US 8,566,511 B2
(45) Date of Patent: Oct. 22, 2013

(54) SOLID-STATE STORAGE DEVICE WITH MULTI-LEVEL ADDRESSING

(75) Inventors: Mohammadali Tootoonchian, Irvine, CA (US); Mark Moshayedi, Newport Coast, CA (US)

(73) Assignee: STEC, Inc., Santa Ana, CA (US)

( * ) Notice: Subject to any disclaimer, the term of this patent is extended or adjusted under 35 U.S.C. 154(b) by 351 days.

(21) Appl. No.: 12/842,950

(22) Filed: Jul. 23, 2010

(65) Prior Publication Data

US 2012/0239855 A1 Sep. 20, 2012

Related U.S. Application Data

(60) Provisional application No. 61/228,134, filed on Jul. 23, 2009.

(51) Int. Cl.
*G06F 12/00* (2006.01)
*G06F 13/00* (2006.01)

(52) U.S. Cl.
USPC ........... 711/103; 711/202; 711/203; 711/205; 711/206; 711/207; 711/E12.014; 711/E12.058; 711/E12.059

(58) Field of Classification Search
USPC .......... 711/103, 203, 205, 206, 207, E12.014, 711/E12.058, E12.059
See application file for complete search history.

(56) References Cited

U.S. PATENT DOCUMENTS

2008/0001958 A1* 1/2008 Vembu et al. ................. 345/531

* cited by examiner

*Primary Examiner* — Midys Rojas
(74) *Attorney, Agent, or Firm* — McDermott Will & Emery LLP

(57) ABSTRACT

A solid-state storage device with multi-level addressing is provided. The solid-state storage device includes a plurality of flash memory devices, a volatile memory, and a controller. The controller is configured to store data received from a host in the plurality of flash memory devices in response to a write command and to read the data stored in the plurality of flash memory devices in response to a read command. The controller is further configured to maintain a multi-level address table that maps logical addresses received from the host identifying the data stored in the plurality of flash memory devices to physical addresses in the plurality of flash memory devices containing the data. A first level of the multi-level address table is maintained by the controller in the volatile memory and second and third levels of the multi-level address table are maintained by the controller in the plurality of flash memory devices.

20 Claims, 5 Drawing Sheets

LOGICAL BLOCK SECTOR ADDRESS TABLE

| LB SECTOR INDEX | LB SECTOR ADDRESS |
|---|---|
| 0x0 | 0x0F0002 |
| 0x1 | 0x128CB4 |
| 0x2 | 0x10FFEE |
| ... | ... |
| 0x18 | 0x2B1512 |
| ... | ... |
| 0x3FFFE | 0x1A232E |
| 0x3FFFF | 0x03F578 |

FIG. 3

| | BITS | | | |
|---|---|---|---|---|
| | 21-10 | 9-4 | 3-1 | 0 |
| LB_SECTOR ADD | BLOCK INDEX | PAGE_S | SECTOR_S | LOC_S |
| 0X2B1512 | 101 0110 0101 | 01 0001 | 001 | 0 |
| 0X2B1512 | 0X565 | 0X21 | 0X1 | 0X0 |

FIG. 4

BLOCK INDEX TABLE

| BLOCK INDEX | BLOCK ID |
|---|---|
| 0x0 | 0x000F0002 |
| 0x2 | 0x0011FFEE |
| ... | ... |
| 0x565 | 0x0000AC54 |
| ... | ... |
| 0x7FF | 0x0001EE01 |

FIG. 5

BLOCK 0x0000AC54

| PAGE # | SECTOR # | | | | | | | |
|---|---|---|---|---|---|---|---|---|
| | 7 | 6 | 5 | 4 | 3 | 2 | 1 | 0 |
| 0x00 | | | | | | | | |
| 0x01 | | | | | | | | |
| ... | | | | | | | | |
| 0x21 | | | | | | | | |
| ... | | | | | | | | |
| 0x3E | | | | | | | | |
| 0x3F | | | | | | | | |

FIG. 6

|  | BITS | | | |
| --- | --- | --- | --- | --- |
|  | 31-11 | 10-6 | 5-3 | 2-0 |
| LB_PAGE ADD | BLOCK_P | PAGE_P | SECTOR_P | LOC_P |
| 0X6150527 | 0 0110 0001 0101 0000 | 1 0100 | 100 | 111 |
| 0X6150527 | 0X6150 | 0X04 | 0X4 | 0X7 |

FIG. 7

BLOCK 0x6150

| PAGE # | SECTOR # | | | | | | | |
| --- | --- | --- | --- | --- | --- | --- | --- | --- |
|  | 7 | 6 | 5 | 4 | 3 | 2 | 1 | 0 |
| 0x00 | | | | | | | | |
| ... | | | | | | | | |
| 0x0E | | | | | | | | |
| ... | | | | | | | | |
| 0x3E | | | | | | | | |
| 0x3F | | | | | | | | |

FIG. 8

SOLID-STATE STORAGE DEVICE WITH MULTI-LEVEL ADDRESSING

This application claims the benefit of U.S. Provisional Application No. 61/228,134, filed on Jul. 23, 2009, which is hereby incorporated by reference herein.

BACKGROUND

Solid-state storage devices use persistent memory to store data. For example, a solid-state storage device may use multiple flash memory chips to store data received from a host. Similar to other types of storage devices, a solid-state storage device maps the address used by the host to identify the data to a physical location in the solid-state storage device where that data is stored. The solid-state storage device maintains and refers to an address table containing the mapping between the host addresses and the physical locations in the solid-state storage device when reading and writing data.

As the capacities of solid-state storage devices increase, larger address tables must be maintained within the solid-state storage devices. Solid-state storage devices may use volatile memory, such as dynamic random access memory (DRAM), to temporarily store address tables during operation. The volatile memory typically improves performance in referencing and maintaining the address tables. However, large amounts of volatile memory for storing address tables may not be possible under design, cost, and/or power constraints associated with the design of solid-state storage devices.

SUMMARY

According to one aspect of the subject technology, a solid-state storage device with multi-level addressing is described. The solid-state storage device includes a plurality of flash memory devices, a volatile memory, and a controller. The controller is configured to store data received from a host in the plurality of flash memory devices in response to a write command and to read the data stored in the plurality of flash memory devices in response to a read command. The controller is further configured to maintain a multi-level address table that maps logical addresses received from the host identifying the data stored in the plurality of flash memory devices to physical addresses in the plurality of flash memory devices containing the data. A first level of the multi-level address table is maintained by the controller in the volatile memory and second and third levels of the multi-level address table are maintained by the controller in the plurality of flash memory devices.

According to another aspect of the subject technology, a method for mapping a plurality of logical addresses received from a host to a plurality of physical addresses in a flash memory device is described. The method includes determining in a controller a first parameter, a second parameter, and a third parameter from a logical address. The first parameter of the logical address is mapped to a first address in a first table stored in a volatile memory, an a second table is read from a flash memory device based on the first address. The second parameter of the logical address is mapped to a second address in the second table and a third table is read from the flash memory device based on the second address. The third parameter of the logical address is mapped to a third address in the third table, wherein the third address is a physical address in the flash memory device containing data associated with the logical address.

According to another aspect of the subject technology, a processor-readable medium containing executable instructions for mapping a plurality of logical addresses received from a host to a plurality of physical addresses in a flash memory device is described. The executable instructions include code for determining a first parameter, a second parameter, and a third parameter from a logical address and mapping the first parameter of the logical address to a first address in a first table stored in a volatile memory. A second table is read from a flash memory device based on the first address and the second parameter of the logical address is mapped to a second address in the second table. A third table is read from the flash memory device based on the second address and the third parameter of the logical address is mapped to a third address in the third table, wherein the third address is a physical address in the flash memory device containing data associated with the logical address.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 3 depicts an example of a logical block sector address table according to one aspect of the subject technology.

FIG. 4 depicts the parsing of a logical block sector address according to one aspect of the subject technology.

FIG. 5 depicts a block index table according to one aspect of the subject technology.

FIG. 6 depicts a block from a flash memory device containing logical block sectors according to one aspect of the subject technology.

FIG. 7 depicts the parsing of a logical block page address according to one aspect of the subject technology.

FIG. 8 depicts a block from a flash memory device containing logical block pages according to one aspect of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
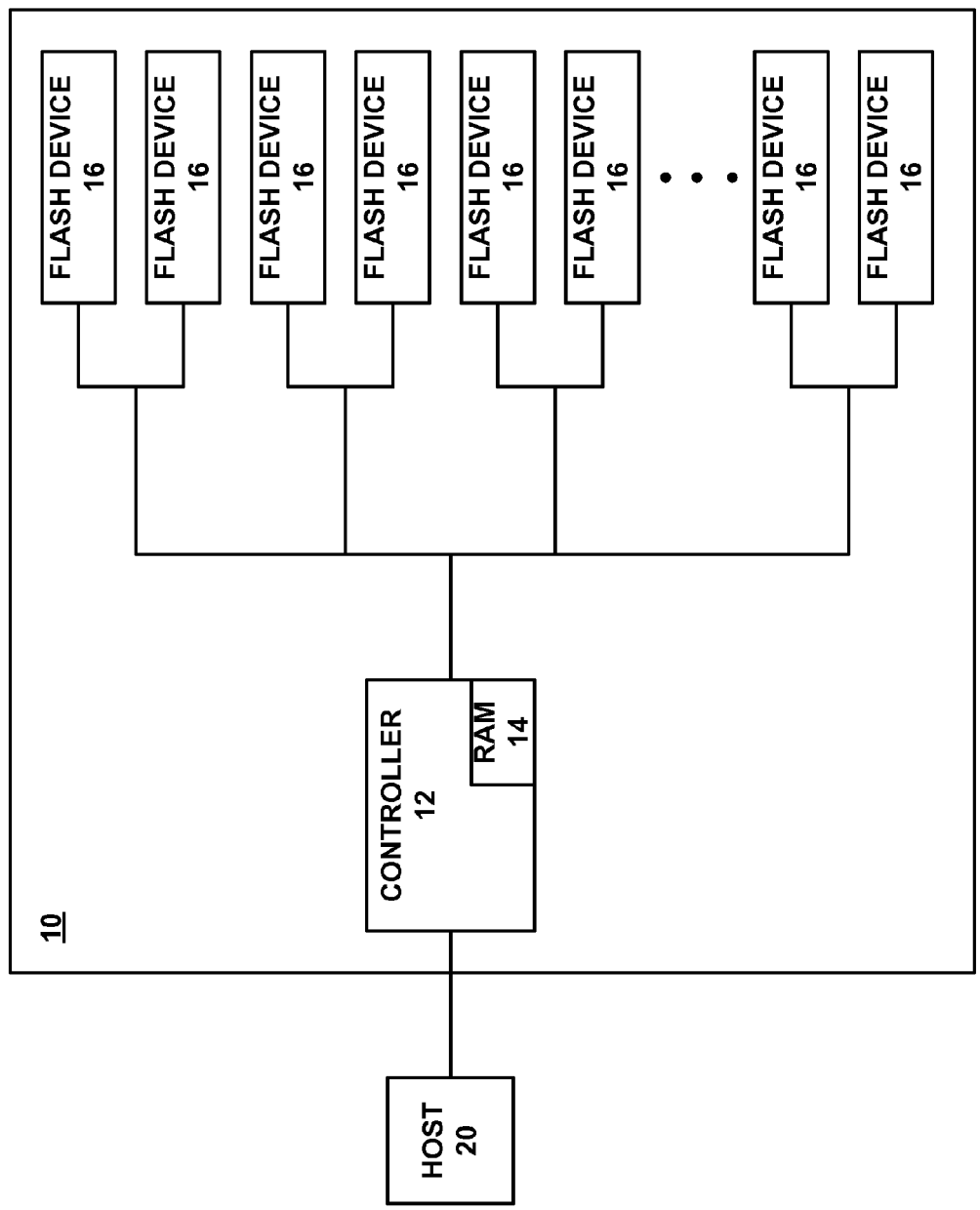
FIG. 1 is a block diagram illustrating components of a solid-state storage device according to one aspect of the subject technology.

FIG. 1 is a block diagram illustrating components of a solid-state storage device according to one aspect of the subject technology. As depicted in FIG. 1, solid-state storage device 10 includes controller 12, random access memory (RAM) 14, and multiple flash memory devices 16. Controller 12 is configured to receive data from host 20 and to store the data in flash memory devices 16 in response to a write command. Controller 12 is further configured to read data from flash memory devices 16 and to transfer the read data to host 20 in response to a read command. As will be discussed in more detail below, controller 12 may use RAM 14 to store and maintain a multi-level address table. Controller 12 also may use RAM 14 as a buffer for transferring data between host 20 and controller 12, for caching data stored in flash memory devices 16, and for other purposes conventionally used by controllers in solid-state storage devices.

Host 20 represents any system configured to interface with solid-state storage device 10 for purposes of storing and retrieving data stored within solid-state storage device 10. Host 20 may be a general purpose computer, a server, a digital camera, a digital audio player, a digital video player, etc. The subject technology is not limited to any particular interface for connecting host 20 with solid-state storage device 10. For example, host 20 may connect to solid-state storage device 10 using USB, SATA, PCIe, etc.

Controller 12 manages the transfer of data between host 20 and flash memory devices 16. Controller 12 also maintains flash memory devices 16 using wear-leveling algorithms, garbage collection routines, etc. Controller 12 may include a processor or microprocessor configured to execute code or instructions to manage solid-state storage device 10. The code may be firmware or software encoded on a processor readable medium within controller 12 or external to controller 12. Processor readable media include electronic media, such as flash, ROM, RAM, etc., magnetic media, such as magnetic disks and tape, and optical media, such as CD-ROM, DVD, etc.

RAM 14 represents volatile memory used by controller 12 for the purposes mentioned above. RAM 14 is not limited to any particular type of volatile memory. For example, RAM 14 may be implemented using DDR DRAM, DDR2 DRAM, etc. FIG. 1 depicts RAM 14 as embedded in controller 12. The subject technology is not limited to this arrangement of RAM 14. For example, RAM 14 may be external to controller 12. In addition, solid-state storage device 10 may include additional volatile memory outside of controller 12 in addition to RAM 14 embedded within controller 12.

FIG. 1 depicts an arrangement of flash memory devices 16 coupled to controller 12 via multiple channels. For example, eight flash memory devices 16 are depicted coupled to controller via four channels with two flash memory devices 16 operating on each channel. The subject technology is not limited to any particular type of interface or channel for connecting flash memory devices 16 to controller 12. For example, a fiber channel interface may be used to couple flash memory devices 16 to controller 12. In addition, the subject technology is not limited to the number flash memory devices 16 depicted in FIG. 1, nor the number of flash memory devices 16 operating on each channel (i.e., two). For example, solid-state storage device 10 may utilize more than four channels or less then four channels. Additionally, solid-state storage device 10 may include more than two flash memory devices 16 operating on each channel or a single flash memory device 16 operating on each channel.

Each flash memory device 16 represents one or more chips containing flash memory cells organized into blocks and pages. For example, each flash memory device 16 may include 8,192 blocks, with 64 pages in each block. Each page within a block may include 4 KB divided into eight 512 byte sectors. Each page may be referred to as a logical block and represents the minimum amount of data that can be written in a single write operation. The physical block of 64 pages represents the minimum amount of data that can be erased in a single erase operation. The subject technology is not limited to the configuration described above. For example, each device may include more or less than 8,192 blocks, each block may contain more or less than 64 pages, and each page may include more or less than 4 KB divided into sectors more or less than 512 bytes.

Upon receiving a write command from host 20, controller 12 receives one or more logical sectors of data from host 20, where the logical sectors are identified by associated logical block addresses (LBAs). Controller 12 is configured to process the write command by transferring the logical sectors of data to flash memory devices 16 and mapping the logical block addresses to the physical block addresses in flash memory devices 16 where the logical sectors of data are stored. Controller 12 is configured to store and maintain these mappings in an address table. Upon receiving a read command from host 20, controller 12 uses the address table to locate the requested data within flash memory devices 16 and read the requested data out of flash memory devices 16.

For improved performance, controller 12 may store the address table in RAM 14 and periodically back-up the address table to one or more of flash memory devices 16. As the total capacity of solid-state storage device 10 increases, so does the amount of space required in RAM 14 to store the address table. To reduce the amount of space required in RAM 14 to maintain an address table, the subject technology provides a multi-level address table that uses both RAM 14 and flash memory devices 16 to store different respective levels of the address table.

According to one aspect of the subject technology, a three-level address table is stored and maintained by controller 12. As will be described in more detail below, a first table is stored in RAM 14, multiple second tables are stored in flash memory devices 16, and multiple third tables also are stored in flash memory devices 16. Controller 12 uses parameters determined from a logical block address to traverse the three levels of the address table and ultimately obtain the physical address within flash memory devices 16 containing the data associated with the logical block address.

The subject technology uses three levels of containers to organize data. A first level container may be referred to as a logical block. According to one aspect of the subject technology, each logical block contains data associated with up to eight consecutive LBAs. All of the LBAs and associated data received from host 20 are organized and stored in logical blocks (first level containers). A second level container may be referred to as a logical block page. According to one aspect of the subject technology, each logical block page contains the virtual to physical mappings (V2P) for eight consecutive logical blocks (first level containers). The addresses of all of the logical blocks (first levels containers) are organized and stored in logical block pages (second level containers). A third level container may be referred to as a logical block sector. According to one aspect of the subject technology, each logical block sector contains the addresses for sixty-four consecutive logical block pages (second level containers).

The addresses of all of the logical block pages (second level containers) are organized and stored in logical block sectors (third level containers). The operation of the multi-level address table will now be described in connection with flow-chart shown in FIG. 2.

Figure 2:
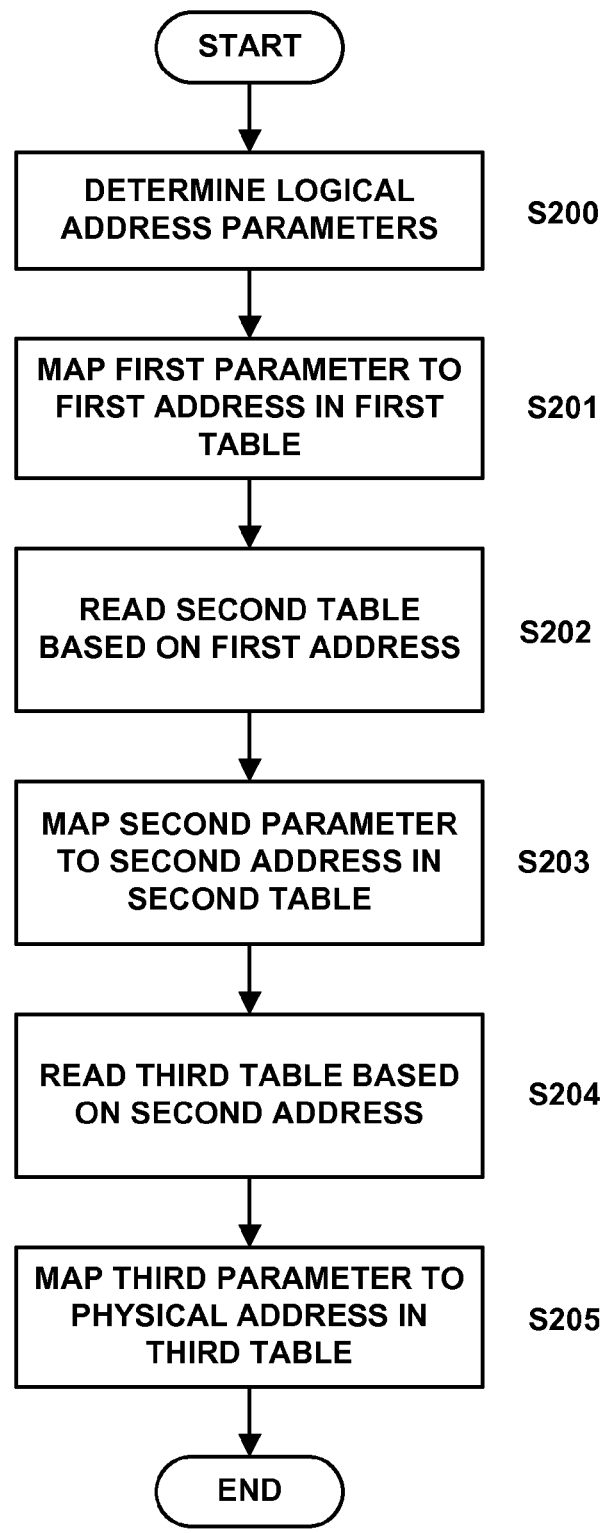
FIG. 2 is a flowchart illustrating a method for mapping a logical address received from a host to a physical address in a flash memory device according to one aspect of the subject technology.

FIG. 2 is a flowchart illustrating a method for mapping a logical block address received from a host to a physical address in a flash memory device according to one aspect of the subject technology. The process begins when controller 12 receives a read command from host 20 containing an LBA for requested data. In step S200, controller 12 determines a set of parameters, or container indices, based on the LBA. According to one aspect of the subject technology, the parameters include a logical block ID (LB_ID), a logical block sector (LB_Sector) number, a logical block page (LB_Page) number, and a logical block page (LB_Page) offset. This set of parameters, or container indices, is used to traverse the multi-level address table to obtain the virtual to physical (V2P) mapping for the logical block address, as discussed below.

The logical block ID (LB_ID) is determined by dividing the LBA by eight, which corresponds to the up to eight LBAs having associated data in each logical block. The remainder of this operation provides the offset within the logical block for the particular LBA.

The logical block sector number is calculated using equation (1a) shown below:

$$\text{LB\_Sector\_Number} = \frac{\text{LB\_ID}}{(LB/\text{LB\_Page} * \text{LB\_Page}/\text{LB\_Sector})} \quad (1a)$$

where LB/LB_Page represents the number of logical blocks (first level containers) per logical block page (second level container) and LB_Page/LB_Sector represents the number of logical block pages (second level containers) per logical block sector (third level container). In the example outlined above, there are eight logical blocks per logical block page and 64 logical block pages per logical block sector. Using this example, controller 12 would determine the LB_Sector_Number for a LB_ID of 0x3124 as shown below:

$$\text{LB\_Sector\_Number} = \frac{0 \times 3124}{(8*64)} = \frac{0 \times 3124}{0 \times 200} = 0 \times 18. \quad (1b)$$

The logical block page number is calculated using equation (2a) shown below:

$$\text{LB\_Page\_Number} = \text{LB\_ID} \% \text{LB\_Page}/\text{LB\_Sector} \quad (2a)$$

where again LB_Page/LB_Sector represents the number of logical block pages (second level containers) per logical block sector (third level container). Continuing with the example configuration outlined above, controller 12 would determine the LB_Page_Number for the LB_ID of 0x3124 using modulo division as shown below:

$$\text{LB\_Page\_Number} = 0x3124\%64 = 0x24. \quad (2b)$$

The logical block page offset is calculated using equation (3a) shown below:

$$\text{LB\_Page\_Offset} = \text{LB\_ID} \% \text{LB}/\text{LB\_Page} \quad (3a)$$

where again LB/LB_Page represents the number of logical blocks (first level containers) per logical block page (second level container). Continuing with the example configuration outline above, controller 12 would determine the LB_Page_Offset for the LB_ID of 0x3124 using modulo division as shown below:

$$\text{LB\_Page\_Offset} = 0x3124\%8 = 0x4. \quad (3b)$$

In step S201, controller 12 looks up the logical block sector address corresponding to the logical block ID in a logical block sector address table (first table) stored in RAM 14. Controller 12 uses the logical block sector number (first parameter) to identify the address of the logical block sector in the table. FIG. 3 depicts an example of a logical block sector address table according to one aspect of the subject technology. As shown in FIG. 3, the logical block sector number is located by controller 12 in the logical block sector index and a logical block sector address corresponding to the location is retrieved. Continuing with the example above, the logical block sector number 0x18 is located in the table and the associated logical block sector address 0x2B1512 is retrieved by controller 12.

In step S202, controller 12 parses the retrieved logical block sector address to determine a Block Index, a page number (Page_S), a sector number (Sector_S), and a location (Loc_S) to locate the logical block sector in flash memory devices 16 and reads the logical block sector corresponding to the retrieved logical block sector address from flash memory devices 16. FIG. 4 is a table illustrating how the logical block sector address is parsed to determine the foregoing values.

As represented in FIG. 4, bits 21-10 of the retrieved logical block sector address identify a block index associated with a block in flash memory devices 16 containing the logical block sector; bits 9-4 identify a page number (Page_S) within the block containing the logical block sector; bits 3-1 identify a sector number (Sector_S) within the page containing the logical block sector; and bit 0 identifies a location (Loc_S) within the sector containing the logical block sector. It is noted that the subject technology is not limited to this number of bits for the logical block sector address and the respective number of bits parsed for the respective values outlined above. The length and parsed divisions of the logical block sector address may vary depending on the configuration and organization of the flash memory devices and the solid-state storage device.

Referring to FIG. 4, controller 12 parses the logical block sector address of 0x2B1512 to identify a block index of 0x565. Using the block index, controller 12 retrieves the address of the block (e.g., NAND block) in flash memory devices 16 corresponding to block index 0x565 from a block index table, such as the one depicted in FIG. 5. According to one aspect of the subject technology, the block index table is stored in RAM 14. Alternatively, the block index table may be stored in flash memory devices 16.

Continuing with the example, controller 12 looks up the physical address of the block corresponding to block index number 0x565 in the block index table, which is shown as 0x0000AC54 in FIG. 5. Using the page number (Page_S), the sector number (Sector_S), and the location (Loc_S) parsed from the logical block sector address, the sector within flash memory devices 16 containing the logical block sector is read from flash memory devices 16. The page and sector within the block are represented with cross-hatching in the diagram in FIG. 6.

In the example configuration outlined above, each physical block in the flash memory devices 16 includes sixty-four pages with eight sectors in each page. Each sector may contain 512 bytes. According to one aspect of the subject technology, each logical block page address comprises 4 bytes. Using these values as one example, each sector of 512 bytes in flash memory devices 16 can store 128 logical block page addresses. As discussed above, each logical block sector contains sixty-four consecutive logical block page addresses. Accordingly, each sector in flash memory devices 16 may contain two logical block sectors, each containing 64 logical block page addresses. The location (Loc_S) is used to identify which of the two logical block sectors corresponds to the parsed logical block sector address.

The logical block sector read from flash memory devices 16 represents a second table within the multi-level table of the subject technology. As noted above, this second table contains sixty-four logical block page addresses. To identify the logical block page address corresponding to the logical block ID, controller 12 uses the logical block page number (LB_Page_Number) determined from the logical block ID in step S200, to identify the logical block page address within the read logical block sector in step S203. In the current example, the logical block page number is 0x24, which indicates that the logical block page address corresponding to the logical block ID is located at an offset of 0x24 within the read logical block sector. Controller 12 locates and stores this logical block page address with the logical block sector.

In step S204, controller 12 reads a logical block page from flash memory devices 16 corresponding to the logical block page address retrieved from the logical block sector in step S203. Similar to step S202, controller 12 parses the retrieved logical block page address to determine a flash block ID (Block_P), a page number (Page_P), a sector number (Sector_P), and a location (Loc_P) to locate the logical block page within flash memory devices 16. FIG. 6 is a table illustrating how the logical block page address is parsed to obtain the foregoing values.

As represented in FIG. 7, controller 12 extracts multiple values from the logical block page address to identify the location of the logical block page in flash memory devices 16. Again the values are derived from the bits of the address. According to one aspect of the subject technology, the logical block page address comprises 32 bits. Bits 31-11 identify a flash block ID (Block_P) within flash memory devices 16, which is the physical address of the block; bits 10-6 identify a page number (Page_P) within the block; bits 5-3 identify a sector number (Sector_P) within the page; and bits 2-0 identify a location (Loc_P) of the logical block page with the sector.

Continuing with the example, controller 12 looks up and reads the logical block page corresponding to the logical block page address using the flash block ID (Block_P) the page number (Page_P), the sector number (Sector_P), and the location (Loc_P) parsed from the logical block page address, the sector within flash memory devices 16 containing the logical block page is read from flash memory devices 16. According to one aspect of the subject technology, logical block pages may be stored in flash blocks with user data pages at a set ratio. For example, within a flash block there may be at least two pages of user data for each logical block page stored in the flash block (i.e., a 2+1 ratio). This ratio is as set parameter for the storage device to reduce potential write amplification that might occur if the flash block contained only logical block pages. Other ratios such as 3+1, 4+1, etc. also may be used. Using the set ratio, the page within the flash block containing the logical block page is computed based on the page number Page_P. For a 2+1 ratio, a Page_P value of 0x00 corresponds to page number 0x02 within the flash block, a Page_P value of 0x01 corresponds to page number 0x05 within the flash block, and so forth. Under a 2+1 ratio setting, a Page_P value of 0x04 translates to page number 0x0E in the flash block. The page and sector within the block are represented with cross-hatching in the diagram in FIG. 8.

According to one aspect of the subject technology, each sector in flash memory devices 16 can contain up to eight logical block pages. The location (Loc_P) is used to identify the logical block page corresponding to the logical block page address within the sector read from flash memory devices 16.

The logical block page read from flash memory devices 16 represents a third table within the multi-level table of the subject technology. As noted above, this third table contains the virtual to physical (V2P) addresses for eight consecutive logical blocks (first level containers). To identify the logical block address corresponding to the logical block ID, controller 12 uses the logical block page offset (LB_Page_Offset) determined from the logical block ID in step S200, to identify the logical block address within the read logical block page in step S205. In the current example, the logical block page offset is 0x4, which indicates that the logical block address corresponding to the logical block ID is located at an offset of 0x4 within the read logical block page. Controller 12 locates and stores this logical block address. Once the correct logical block is mapped and the physical address associated with the logical block ID, controller 12 can read the data from the physical location and respond to the read request from the host.

While the foregoing examples illustrate read operations, controller 12 also is configured to update the multi-level address table when write operations or various maintenance operations are performed. Because of the multi-level structure and the nature of flash memory devices, when the data associated with a logical block address is modified, it is written to a new block within flash memory devices 16. This causes the physical address associated with that logical block ID stored in the corresponding logical block page to change. The change in location for the logical block page in turn causes the logical block sector containing the logical block page address to change.

Rather than updating the entire multi-level address table every time a modification occurs, controller 12 may simply cache logical blocks, logical block pages, and logical block sectors in RAM 14. Once enough logical blocks have been changed to fill up the minimum capacity for write operation (e.g., 4k), controller 12 may updated the multi-level address table to reflect the changes. Controller 12 may operate similarly with respect to caching changes to logical block pages and logical block sectors until enough changes have accumulated to fill the minimum capacity for a write operation.

The logical page sectors and the logical page blocks may be written and managed within flash memory devices 16 using the same management algorithms applied to other data. For example, blocks containing logical page blocks and/or logical page sectors may be subjected to regular wear-leveling and garbage collection routines by controller 12.

As discussed above, the multi-level address table only maintains a portion of the address table in volatile memory with the remainder in flash memory devices 16. This arrangement significantly reduces the size requirements for the address table in RAM 14, thereby allowing RAM with lower capacity to be used, or shifting newly gained capacity to other functionality implemented within solid-state storage device 10.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A solid-state storage device comprising:
    a plurality of flash memory devices;
    a volatile memory; and
    a controller configured to store data received from a host in the plurality of flash memory devices in response to a write command and to read the data stored in the plurality of flash memory devices in response to a read command,
    wherein the controller is further configured to maintain a multi-level address table that maps logical addresses received from the host identifying the data stored in the plurality of flash memory devices to physical addresses in the plurality of flash memory devices containing the data, and
    wherein a first level of the multi-level address table is maintained by the controller in the volatile memory and second and third levels of the multi-level address table are maintained by the controller in the plurality of flash memory devices.

2. The solid-state storage device according to claim 1, wherein the first level of the multi-level address table maps to the second level of the multi-level address table based on a first parameter of the logical addresses, the second level of the multi-level address table maps to the third level of the multi-level address table based on a second parameter of the logical addresses, and the third level of the multi-level address table maps to the physical addresses in the plurality of flash memory devices containing the data based on a third parameter of the logical addresses.

3. The solid-state storage device according to claim 2, wherein the first level of the multi-level address table comprises a first table, the second level of the multi-level address table comprises a plurality of second tables, and the third level of the multi-level address table comprises a plurality of third tables, and
    wherein each entry in the first table maps to a respective one of the plurality of second tables, and each entry in each of the plurality of second tables maps to a respective subset of the plurality of third tables.

4. The solid-state storage device according to claim 3, wherein the controller is further configured to determine the first, second, and third parameters of the logical addresses.

5. The solid-state storage device according to claim 1, wherein the volatile memory is embedded in the controller.

6. The solid-state storage device according to claim 1, wherein the volatile memory is dynamic random access memory.

7. A method for mapping a plurality of logical addresses received from a host to a plurality of physical addresses in a flash memory device, the method comprising:
    determining in a controller a first parameter, a second parameter, and a third parameter from a logical address;
    mapping the first parameter of the logical address to a first address in a first table stored in a volatile memory;
    reading a second table from a flash memory device based on the first address;
    mapping the second parameter of the logical address to a second address in the second table;
    reading a third table from the flash memory device based on the second address; and mapping the third parameter of the logical address to a third address in the third table, wherein the third address is a physical address in the flash memory device containing data associated with the logical address.

8. The method according to claim 7, further comprising extracting in the controller a first plurality of values from the first address,
wherein the second table is read from the flash memory based on the first plurality of values extracted from the first address.

9. The method according to claim 8, wherein the first plurality of values comprises a first block value, a first page value, and a first sector value.

10. The method according to claim 8, further comprising extracting in the controller a second plurality of values from the second address,
wherein the third table is read from the flash memory based on the second plurality of values extracted from the second address.

11. The method according to claim 10, wherein the second plurality of values comprises a second block value, a second page value, and a second sector value.

12. The method according to claim 7, wherein the first table comprises a plurality of first addresses, each of the plurality of first addresses corresponding to a respective one of a plurality of second tables in the flash memory device,
wherein each of the plurality of second tables comprises a plurality of second addresses, each of the plurality of second addresses corresponding to a respective one of a plurality of third tables in the flash storage device, and
wherein each of the plurality of third tables comprises a plurality of third addresses, each of the third addresses corresponding to a respective one of a plurality of physical addresses in the flash memory device containing data associated with respective logical addresses.

13. The method according to claim 12, wherein each of the plurality of second tables comprises sixty-four second addresses.

14. The method according to claim 13, wherein each of the plurality of third tables comprises eight third addresses.

15. The method according to claim 12, wherein determining the first parameter comprises the controller performing integer division on the logical address with the product of the number of second addresses in each of the plurality of second tables and the number of third addresses in each of the plurality of third tables.

16. The method according to claim 15, wherein determining the second parameter comprises the controller performing a modulo operation on the logical address with the number of second addresses in each of the plurality of second tables.

17. The method according to claim 16, wherein determining the third parameter comprises the controller performing a modulo operation on the logical address with the number of third addresses in each of the plurality of third tables.

18. A non-transitory processor-readable medium containing executable instructions for mapping a plurality of logical addresses received from a host to a plurality of physical addresses in a flash memory device, the executable instructions comprising code for:
determining a first parameter, a second parameter, and a third parameter from a logical address;
mapping the first parameter of the logical address to a first address in a first table stored in a volatile memory;
reading a second table from a flash memory device based on the first address;
mapping the second parameter of the logical address to a second address in the second table;
reading a third table from the flash memory device based on the second address; and
mapping the third parameter of the logical address to a third address in the third table, wherein the third address is a physical address in the flash memory device containing data associated with the logical address.

19. The non-transitory processor-readable medium according to claim 18, further comprising code for extracting a first plurality of values from the first address,
wherein the second table is read from the flash memory based on the first plurality of values extracted from the first address.

20. The non-transitory processor-readable medium according to claim 19, further comprising code for extracting a second plurality of values from the second address,
wherein the third table is read from the flash memory based on the second plurality of values extracted from the second address.

* * * * *